US005615351A

United States Patent [19]

Loeb

[11] Patent Number: 5,615,351

[45] Date of Patent: Mar. 25, 1997

[54] METHOD AND SYSTEM FOR CORRELATING USAGE DATA IN A DISTRIBUTED ARCHITECTURE

[75] Inventor: Shoshana K. Loeb, Basking Ridge, N.J.

[73] Assignee: Bell Communications Research, Inc., Morristown, N.J.

[21] Appl. No.: 499,334

[22] Filed: Jul. 7, 1995

[51] Int. Cl.[6] .......... G06F 17/40

[52] U.S. Cl. .......... 364/400; 395/613

[58] Field of Search .......... 364/DIG. 1 MS File, 364/DIG. 2 MS File, 400; 379/111, 112, 113; 395/401, 402, 403, 404, 405, 406, 613

[56] References Cited

U.S. PATENT DOCUMENTS 5,008,929 4/1991 Olsen et al. .......... 379/112
5,223,699 6/1933 Flynn et al. .......... 235/380
5,325,290 6/1994 Cauffman et al. .......... 364/401

*Primary Examiner*—Robert B. Harrell
*Attorney, Agent, or Firm*—Joseph Giordano

[57] ABSTRACT

A method and system for providing a dynamic key in usage records for correlating the usage data records created in a distributed computer or telecommunications network. The dynamic key is a composite structure which captures and reflects the control flow between the service components. The method as been implemented in a software object that would be resident in each component of a distributed telecommunications system. Specifically, the keys created are dynamic key comprised of at least two fields. The first field is a unique identifier that identifies the session. The second field is number that identifies the position within the sequence of invoked components that the present component was invoked. This dynamic key is forwarded to the next component and is used as the unique identifier and becomes the first field in the next component's key. These keys allow for correlating usage data records from disparate sources to accomplish such activities as billing and/or fraud detection.

10 Claims, 3 Drawing Sheets

METHOD AND SYSTEM FOR CORRELATING USAGE DATA IN A DISTRIBUTED ARCHITECTURE

TECHNICAL FIELD OF THE INVENTION

This invention relates to the methods and systems used to correlate usage data in a distributed computer network.

BACKGROUND OF THE INVENTION

As the telecommunication industry evolves, new flexible and extendable technologies are being introduced into the network that allow for the provisioning of distributed services to the customer. Broadband services, multimedia services and personnel communications services (PCS) are some of the services that are soon to be introduced. These services will be provided to customers from a plurality of service providers using a distributed service platforms over a communications infrastructure. When such services are requested by a customer, different service control, resource control and management components are invoked in order to provide the customer with the requested services. The customer, in using the requested service, places different usage requirements on these components. Collecting data on such usage of the different components and correlating this usage to the customer is necessary to accomplish such basic business functions as billing, marketing and/or fraud detection.

Using a key to correlate data from multiple distributed sources is well known in the art. One well known method is "implicit key correlation" another is "static key correlation". Implicit key correlation is a concept whereby the key that is used correlate data is information that is normally part of the usage record (such as date and time or phone number). This is the method currently used in telephony billing. Static key correlation is a method whereby a constant key is used by all service components whenever a service is activated and this key is inserted into all usage records regardless of who invoked the component.

However, there are problems with these two methods in an environment of flexible distributed services. Regarding implicit key correlation, a simple example that illustrates a problem is what happens in an 800 phone call. Once a user places an 800 phone call, the 800 number is translated into a local phone number reflecting the network location where the call should be terminated. When using implicit key correlation and with the implicit key being the phone number, the usage records generated before the translation cannot be correlated with the usage records generated after the translation because the phone number has changed.

A problem with static key correlation methods is that it does not provide a capability for capturing the sequence of invocation for the different components of the service that generated the records. The sequence of invocation of differing service components is important because in the future, pricing policies of services may be sensitive to the invocation context.

My invention overcomes the limitations in the prior art methods and systems by providing a capability for capturing the sequence in invocation of the various network components used as a result of the service request and the network providing the service.

SUMMARY OF THE INVENTION

It is an object of the present invention to provide a method and system for correlating usage records from distributed sources that overcomes the limitations in the prior art. My invention is method and system for providing a dynamic key in usage records. The dynamic key is a composite structure which captures and reflects the control flow between the service components.

DETAILED DESCRIPTION

Figure 1:
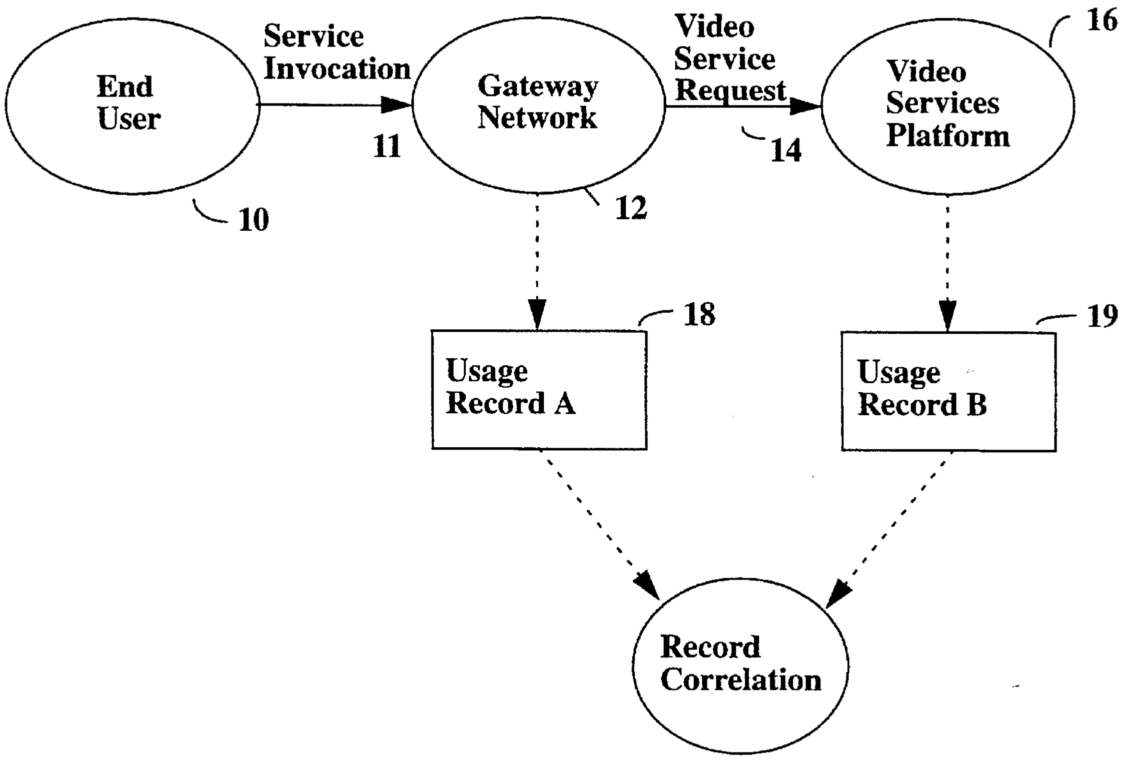
FIG. 1 illustrates a network for providing video service.

My invention is easiest understood when it is described in the context of a simple illustration of a problem. Consider the generic case illustrated in FIG. 1. The customer 10 requests a video service. That request is made by sending a service request 11 to the gateway network 12 which in turn makes a subsequent video service request 14 to the video service provider's service platform 16. The requested video service is then transmitted by the video service platform 16 over the gateway network 12 to the customer 10. In order to bill the customer 10, a usage record 17 is generated for the gateway network 12 (and in fact may be generated by multiple components of the gateway network) and another usage record 18 is generated by the video services platform 16. The problem presented is the need to correlate between these usage records.

My invention is a system and method whereby included within each network component in gateway network 12 and within each network component in the video service provider platform 16 are processes for inserting within the usage records a correlation key which is generated in accordance with a correlation function having a set number of characteristics.

The requirements of the correlation function are threefold: (1) it must uniquely identify the service component invocation event; (2) it must contain information regarding the invoking component key; (3) it must contain information from which can be derived the total number of usage records that have been generated by the service components of a given service.

In one embodiment of my invention, a correlation key is generated having three fields. The first two fields are provided by the first network component invoked by the customer. The first of these fields would be populated by a session ID generated by the correlation process. As an example this session ID could be something as simple as the phone number of the customer. The second field of these two fields would be populated by a unique number that is unique to the current invocation of that component. The combination of the first two fields provides a unique identifier for the current service session. The third field (which is optional) is populated by data from subsequently invoked networked components to identify the number of records that can be expected as a result of the components that were invoked.

Figure 2:
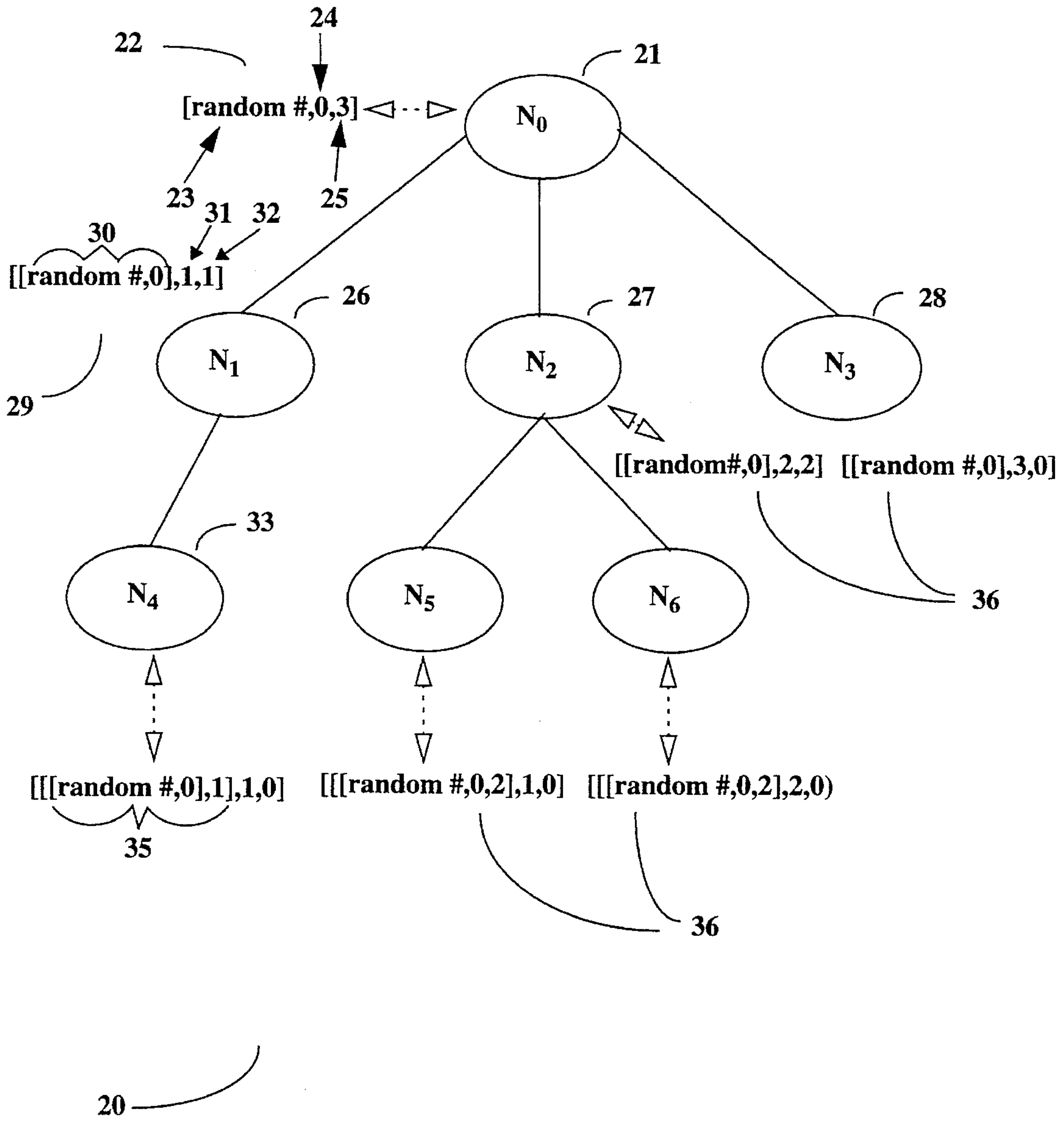
FIG. 2 depicts one embodiment of a dynamic key in accordance with my invention.

FIG. 2 illustrates an example of one implementation of my inventive method. FIG. 2 depicts a tree 20 where every node in the tree is an invoked service component. Node 21 ($N_0$) depicts the network component that interacts with the customer. When $N_0$ 21 would be invoked a usage record would be generated by a process embodied within $N_0$ 21 that would include a key, generated by the process, having the form [session-id, sequence in the number of nodes invoked by the predecessor node, number of nodes successfully invoked in total]. In FIG. 2 the item labeled 22 depicts the key for the usage records generated by node $N_0$ 21. The session-id field 23 is depicted as a random number generated by $N_0$ 21, which would be unique across the whole service platform, $N_0$ is the first node invoked so there aren't any predecessor nodes, hence 0 as shown in field 24, and the number of nodes successfully invoked by $N_0$ 21 which is 3 as shown in field 25, representing the three nodes $N_1$ 26, $N_2$ 27 and $N_3$ 28 invoked by $N_0$ 21. Accordingly, when $N_1$ 26 is invoked, a usage record would be generated by a process embodied in $N_1$ which would produce the key depicted as item 29. The session-id field 30 in this key 29 is comprised of the first two fields generated in key 22 and communicated to it by node $N_0$ 21. Appended to this information is a field 31 having the number 1 representing that $N_1$ was the first node invoked by $N_0$. The third field is the number of nodes successfully invoked by $N_1$, in this instance one node, $N_4$ 33, is successfully invoked. Similarly, a key for a usage record generated by $N_4$ 33 would be as shown as item 34. The unique identifier field in key 34 is the first two fields in key 29, labeled as 35 in FIG. 2. For each of the other nodes depicted in FIG. 2, usage records with keys constructed in accordance with my inventive method would be generated. These keys are shown as the items labeled 36 in FIG. 2.

Once the service invocation by the customer is completed, the usage records generated by each of the nodes (i.e. components) with their unique keys would be transmitted independently to a usage data server. The usage data server would correlate the usage records using procedures well known in the art. The keys generated by my inventive method embody sufficient information to not only correlate the usage of each component but also the service context under which each component was used.

Figure 3:
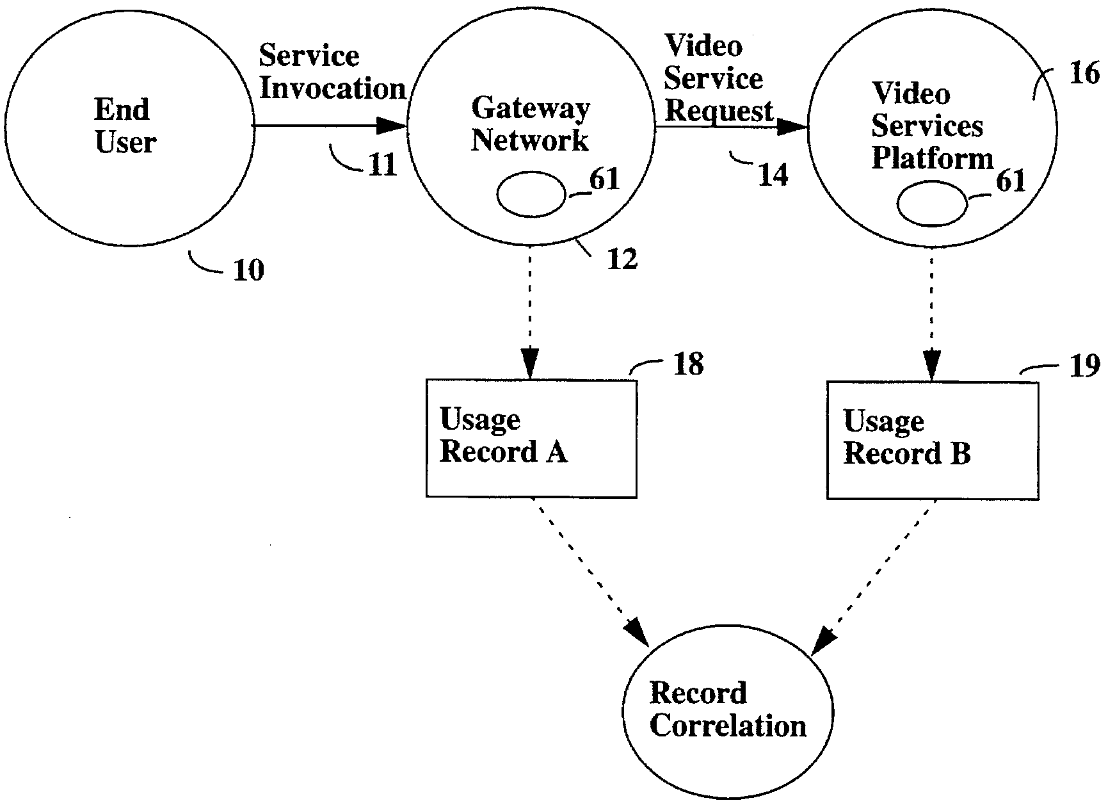
FIG. 3 illustrates a network for providing a video service including a software object in accordance with my invention.

My inventive method and system has recently been embodied in a software system designed to be a controller for broadband services (BSC). Specifically, my correlation key management system and method has been implemented using software objects (in the object oriented programing paradigm) which are resident in each network component. FIG. 3 depicts an example of a broadband network for providing video service using my invention. Specifically, this network is the same network depicted in FIG. 1, however within each component of the network is resident the software object 61 that accomplishes the functions in accordance with my invention.

The correlation key generated in this embodiment is of the form sesID.requestID.1.1.1.etc. The sesID is derived from a Session ID object using datatype DCEUuid which is defined to be globally unique by the Open Software Foundation's Distributed Computing Environment (DCE). The DCE is defined in a document produced by the Open Software Foundation entitled "OSF DCE Application Development Reference", Revision 1.0.3 published by Prentice Hall in Englewood Cliffs, N.J.. The request ID is added to the key by a communications process known as the Signalling Adapter (SA) and is used to identify multiple requests initiated within the same session. In the context of a video services platform, a session may by the establishment of communications channel to the video services platform, and the request ID may represent individual services of functional features requested within the session established.

The Correlation Key object in this embodiment is composed of at least two constructors, two methods, and two variables. The two constructors are defined as CorrelationKey(sessionID, requestID) and xbsCorrelationKey(uniqueKey). The methods are defined as getNextKey method, and the get RootKey method. The two variables are the rootKey and cKey.

When the BSC receives a new session request from a customer, the communications process, also known as the Signalling Adapter, would invoke the Correlation Key Object to create a root correlation key. Since this is the initial request, the CorrelationKey constructor, which passes two parameters (sessionID and requestID), operates the getrootKey method to provide the initial correlation key which is then stored as the rootKey variable. If the session requires the use of other building blocks in the BSC, then the SA makes a request for service from another building block and the Correlation Key object within the SA would use the getNextKey method to increment the cKey variable and place the information in the cKey variable in the header information of the request to the next building block. This is accomplished by a call to a private function CorrelationEngine which increments the contents of the cKey variable and then the getNextKey method places the information in the header. Since this is the initial session request and therefore the cKey variable is null, the CorrelationEngine will append a 0.1 to the string stored in the rootKey variable and then set it to cKey. If the cKey was not null it would increment the last number after the last period in the key.

When this second building block receives the request message, it would extract from the header information the value of the cKey variable received from the SA and its Correlation Key object would invoke constructor xbsCorrelationKey (uniqueKey), with uniqueKey being a parameter the value of which is initially the value of the received cKey. The xbsCorrelationKey would use its getRootKey method to create its own correlation key from the information received.

The keys generated by my method and system would be included, using any one of the many methods known in the art, in usage data records generated for each of the building blocks used to provide a service to a customer.

It is to be understood that my method and system as described herein is not limited to the specific forms disclosed and illustrated, but may assume other embodiments limited only by the scope of the appended claims.

I claim:

1. A method for generating correlation keys for usage data records in a distributed computer environment having multiple components whereby when a service is requested by a user said components are invoked in a sequence to provide said service, said method, executed by a computer, comprising the steps of:

generating a first unique identifier for each user request at the first of said components;

appending to said first unique identifier a number indicating said components position in said sequence, which in combination comprise a correlation key;

including said correlation key in the usage data record created for said first component and said service request;

passing said correlation key to a next one of said components in said sequence within a request for service is made to said next one of said components;

generating a second unique identifier for said request for service made at said next one of said components, with said unique identifier composed of said correlation key received in said request for service;

appending to said second unique identifier a number indicating said components position in said sequence, which in combination comprise a correlation key; and including said correlation key in the usage data record created for said next one of said components.

2. The method as recited in claim 1 wherein said appending to said first unique identifier step further comprises the step of:

appending to said combination of said first unique identifier and number indicating said components position in said sequence, a number indicating the total number of successfully invoked from said first component.

3. The method as recited in claim 2 wherein said appending to said second unique identifier step further comprises the step of:

appending to said combination of said second unique identifier and a number indicating said components position in said sequence, a number indicating the total number of successfully invoked from said next one of said components.

4. The method as recited in claim 3 wherein said first unique identifier is a random number.

5. The method as recited in claim 1 wherein said unique identifier is a composed of a session identifier representing the initial service request by the user.

6. The method as recited in claim 1 wherein said unique identifier composed of a combination of a session identifier representing the general service request by the user and a request identifier which represents specific functionally feature requests by said user within said general service request.

7. A system for providing a dynamic key to be included in usage data records generated by components of a distributed computer system, said system comprising:

means, located within each of said components, for generating a correlation key having at least two fields with said first field representing a unique session identifier for a present invoked component and the second field representing the position in a sequence of invoked components in which said presently invoked component was invoked;

transmitting means to send to a next component said correlation key information of said presently invoked component; and including means for including said correlation key in a usage data record.

8. The system as recited in claim 7 further comprising:

a receiving means for receiving correlation key information from another component and whereby said means for generating means uses said received correlation key information to populate said first field.

9. The system as recited in claim 7 wherein said means for generating is a software object comprising:

a root key variable;

a correlation key variable;

a first constructor for generating a an initial correlation key;

a second constructor for generating subsequent correlation keys from said initial correlation key;

a means for passing a correlation key to a subsequent component; and a means for creating a correlation key for the instant component;

whereby when a usage request is received by a component of the system said first constructor is used to create an initial correlation key if said component is the first component from which service is requested or said second constructor is used to create a correlation key if said component is not the first component to receive said service request and said means for creating a correlation key creates a key to be stored in said root variable an said means for passing a correlation key increment said correlation key variable if said correlation key variable is not null or appends to the value stored as said root key variable a number and then sets said root key variable with said appended number to said correlation key variable.

10. A method for creating keys for usage data records in each component of a distributed telecommunications system, said method, executed by a computer, comprising the steps of:

creating a key in a component invoked in a service request by a user;

modifying said key with information indicating the order is which said component was invoked;

forwarding said modified key to another component necessary for providing said user with the requested service; and using said modified key for creating a key in said another component.

* * * * *